Figure 1:
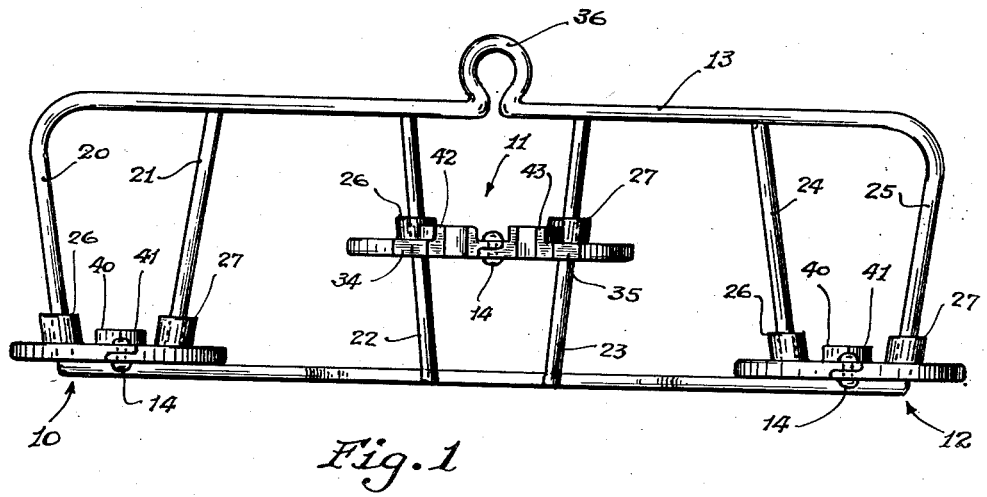

Aug. 31, 1948.  E. M. DAVIS  2,448,421
POULTRY SHACKLE

Filed July 12, 1945  2 Sheets-Sheet 2

INVENTOR.
Elmer M. Davis
BY
R. G. Story
ATTORNEY

Patented Aug. 31, 1948

2,448,421

UNITED STATES PATENT OFFICE 2,448,421

POULTRY SHACKLE

Elmer M. Davis, St. Paul, Minn., assignor to Swift & Company, Chicago, Ill., a corporation of Illinois Application July 12, 1945, Serial No. 604,580

10 Claims. (Cl. 17—44.1)

This invention relates to a device for holding articles against a substantially continuous pull in one direction and more particularly to a shackle device for releasably holding the individual carcasses of poultry products suspended from a conveyor track while passing them through a defeathering machine or the like.

It is an object of this invention to provide an improved supporting shackle for releasably engaging articles passing to a machine adapted to perform an operation upon the article.

Another object of this invention is to provide a releasable shackle for holding poultry products in suspended position as they pass through a defeathering machine.

A further object of this invention is to provide a carcass supporting shackle for poultry products that is adapted to be quickly engaged or released from the legs or necks of the individual carcasses to hold them in suspended position.

Other objects will appear from the specification below.

Figure 2:
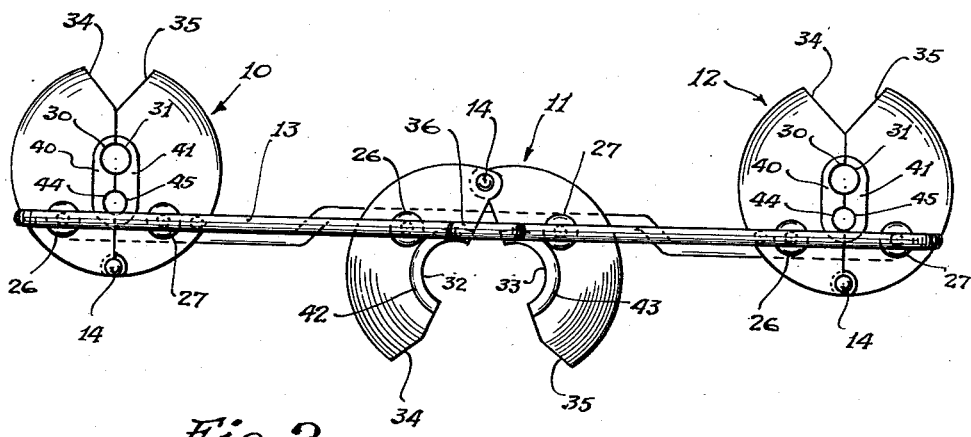
Figure 3:
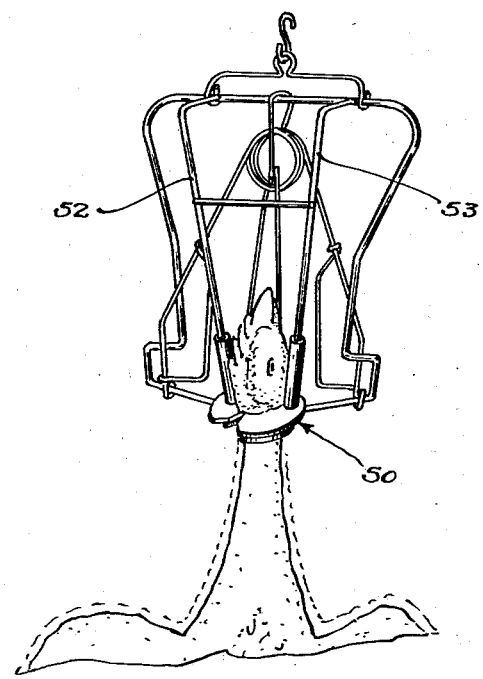
Figure 4:
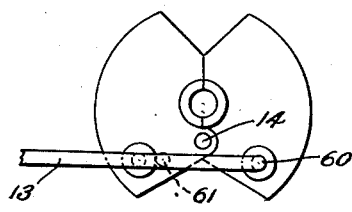
Figure 5:
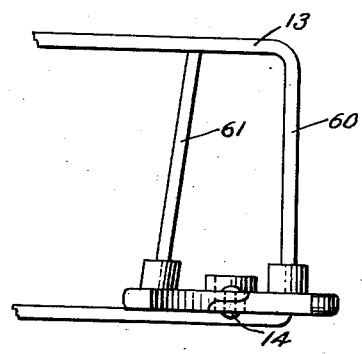

In the drawings:

Figure 1 is a side elevation of the preferred form of the mechanism of the present invention, showing a middle pair of jaws raised to a partially opened position, Figure 2 is a plan view of the elements shown in Figure 1, Figure 3 is a perspective view of another adaptation of the basic invention for holding the carcass of a chicken in a suspended position, Figure 4 is a plan view partly broken away of a modification of the jaw mechanism as shown in Figure 2, and Figure 5 is a side elevation of the mechanism shown in Figure 4.

The recent development and use of mechanical defeathering machines in the large scale slaughtering and dressing of poultry products, has led to the introduction of production line methods in the larger plants. The practice of this mode of defeathering the carcasses of poultry products requires that the individual carcasses be suspended, either by engaging their feet or necks, while they are being delivered through a mechanical defeathering machine on a conveyor and the system is designed to cause the carcass to dwell in the defeathering zone for a sufficient period to accomplish a substantially complete removal of the feathers from the carcass.

Various shackle means have been devised for use with such defeathering means and the like, to engage and support the individual carcasses, as typified by the shackle shown in the patent to A. W. DeVout, No. 2,035,948, dated March 31, 1936. This patented device is adapted to receive the legs of the individual carcasses and hold them between a pair of springs and the frame of the shackle so that the carcass may be supported in a suspended position as it moves down the production line through the various steps or treatments including defeathering, scalding, and the like.

The present invention is an improvement on shackle means for this purpose and may be used for conveying carcasses along the entire production line. The structure includes movable jaw elements operable to engage either the legs or the necks of the individual carcasses or both the legs of one carcass and the neck of another. An important feature of the invention resides in the mounting of the jaw elements in such a manner that they may be very quickly and easily opened to receive or release the carcasses.

The basic concept of the present invention takes the form of jaw elements pivotally fixed together so that they may be opened and shut relatively, which jaw elements are mounted on the shackle support to cooperate with camming surfaces. The cam surfaces are so disposed that they effect the opening of the jaw elements as the jaws are lifted and the closing of the jaws as the jaw elements are lowered.

Referring more particularly to the drawings, the preferred form of the device is best shown in Figures 1 and 2, wherein three pairs of jaw elements 10, 11, and 12 are represented as supported from the frame 13 of the shackle. The pairs of jaw elements are each pivotally fixed together by separate pins 14, whereby they may be opened and shut and each one of the jaw elements is slidably mounted upon cam means carried by the frame 13 of the shackle. The cam means may take the form of cylindrically shaped pairs of posts 20, 21; 22, 23; and 24, 25; which diverge relatively when moving from the bottom to the top and the cams cooperate with the pairs of jaw elements 10, 11, and 12 respectively, by means of suitable sliding bearings 26 and 27 which are provided on each of the pairs of jaw elements 10, 11, and 12 to engage the cam means.

It is apparent, referring to Figure 1, that as the pairs of jaw elements are raised and lowered, the sliding bearings 26 and 27 are moved toward and away from each other whereby the jaw elements fixed together at pivot 14 are caused to open and close with respect to each other.

Referring to Figure 2, the two pairs of jaw elements 10 and 12 face in one direction while the third or middle pair of jaw elements 11 are mounted to face in the direction substantially diametrically opposite. The pairs of jaw elements 10 and 12 are each provided with cooperating notches 30 and 31 of a size to neatly surround the legs of the individual carcasses, while the pair of jaw elements 11 is provided with larger cooperating notches 32 and 33, designed to fit snugly around the necks of the individual carcasses. Each of the pairs of jaw elements 10, 11, and 12 are relieved adjacent their nose portions as at 34 and 35 to provide guiding surfaces to funnel the article to be engaged into position between the jaws. Thus, when using the form of the invention shown in Figure 2, the two legs of the individual carcasses may be positioned between the pairs of jaw elements, 10 and 12, whereby the carcass may be suspended or, if it is desired, to suspend the carcass in an opposite manner, the neck of the carcass may be pushed between the pair of jaw elements 11.

The shackle device, as shown in Figure 1, has a ring 36 fixed to the frame so that the shackle may be hung from a trolley supported on a conveyor track and when the carcass of a bird is fixed in the shackle it hangs downwardly. To place a bird in the shackle, the necks of the carcasses, for example, are engaged by the operator and held into the guide surfaces 34 and 35 while the jaw elements 11 are lifted whereby cam surfaces 22 and 23 cause them to open. The guide surfaces force the neck of that particular carcass into position between the pair of jaw elements 11 and as soon as the necks pass between the jaws to fall into the notches 32 and 33, the jaw elements may be lowered to shut them. Upon being lowered, the jaw elements are closed and the neck is firmly engaged between the jaws with the feet projecting downwardly. Similarly the two legs of a carcass may be inserted one in each of the pairs of jaw elements 10 and 12 to hang the carcass head down.

When a carcass has been hung in a shackle, as above described, it may be passed through a mechanical defeathering machine or other operation and the weight of the carcass is ordinarily sufficient to hold the jaw elements down with sufficient force such that they cannot accidentally be opened. After proper treatment has been accomplished, the carcass may be quickly released by lifting the jaw elements to open them so that the legs or neck can be withdrawn from between the pairs of jaw elements.

In order to adequately protect the legs and necks of the products being treated, a sufficient surface for engagement should be provided and thus the collars 40 and 41 may be provided on the pairs of jaw elements 10 and 12 and collars 42 and 43 may be incorporated on the pair of jaw elements 11. It will also be noted that a second set of cooperating notches 44 and 45 are provided in each of the pairs of jaw elements 10 and 12. These feet or leg engaging notches may be used to hang the carcass centrally of the shackle or to receive the legs when they would otherwise block the closing of the jaw elements.

During the processing of the carcasses in a defeathering machine, it has been found that two carcasses may be hung on a single shackle such as that of the present design and substantially complete defeathering can be accomplished. Due to the agitation of the two carcasses hung from a single shackle upon being engaged by the mechanical beating means which accomplish the pulling of the feathers, all areas of the surfaces of the carcasses become exposed so that the defeathering treatment can usually be performed on two carcasses simultaneously. Further, when two carcasses are hung on a single shackle, the more tender breast meat of the poultry product is somewhat protected against damage caused by undue beating.

With the arrangement here shown, one carcass to be defeathered can first be hung feet uppermost in the shackle and passed through the machine. The carcass is usually completely defeathered by such an operation, however, if complete removal of the feathers has not been effected, then the carcass may be released from the shackle and returned to the inlet side of the machine hung by its neck to pass through the machine along with an incoming carcass suspended by its legs. It has been found that the two carcasses may be passed through the machine to complete the defeathering of the first carcass and usually a complete defeathering of the second carcass is simultaneously accomplished. In addition to completing the simultaneous defeathering of two carcasses, the hanging of the second carcass on the shackle tends to protect the delicate breast tissues of the birds against the more severe beating produced against the surface of the carcass during defeathering of a single carcass hung from a shackle.

From the description of the device and its operation as given above, the preferred form of the invention will be understood. The shackle has particular utility in connection with the defeathering of poultry carcasses. It is apparent, however, that it has many other uses and it is contemplated that the carcasses may be conveyed through many other production line operations while supported from the shackle.

Modifications of the invention will undoubtedly occur to those skilled in the art, for example, the basic jaw elements of the above described shackle may be incorporated in the conventional De Vout type shackle structure for hanging the carcass from this known type of device by the neck. Such an arrangement is shown in Figure 3, where the jaw elements 50 are mounted on the cam rods 52 and 53 to operate, as above described. Another obvious modification would reside in an alteration of the camming or bearing structure for the jaw elements that effects the positive opening and closing thereof. The drawings indicate that the pairs of cam tracks which cooperate with the respective pairs of jaw elements each diverge, but the same result would be accomplished if one of the cam tracks were vertical and the other diverged with respect thereto, and depending upon the pivot arrangement for the jaws, the cam means may be considered to diverge from the bottom to top, as shown in Figure 1, or from top to bottom, as indicated by rods 60 and 61 in Figure 5. It is also to be noted (assuming Figure 2 to show a third class lever arrangement, in effect, for the mounting of the jaw elements), that should the pivotal mounting 14 be disposed on the opposite side of frame 13 so as to form a first class lever arrangement with respect to the jaws, pivot and cams, as shown in Figures 4 and 5, then it would be essential that the cam tracks 60 and 61 should converge relatively when moving from the bottom toward the top in order to effect opening of the jaw elements.

The above is a description of the invention and several modes of its application together with several suggested modifications thereof. Other modifications will perhaps occur to those skilled in the art, all of which are contemplated to fall within the scope of the following claims.

I claim:

1. A releasable shackle for supporting an article hung therefrom comprising: a pair of pivotally connected jaw elements that may be opened and shut relatively; said jaw elements being adapted to engage and hold the article being worked upon; and supporting means for said jaw elements upon which said jaw elements are slidably mounted; said supporting means including relatively diverging means cooperating with each of the individual jaw elements at a point spaced from the pivotal connection to effect relative opening and closing of the jaw elements upon movement of the jaw elements along the diverging means in one direction or the other; whereby, as said jaw elements move in one direction, they are closed to engage the article to be hung from the shackle, and as said jaw elements are moved in the opposite direction, the article may be released from engagement between the jaw elements.

2. A releasable shackle for holding individual carcasses of poultry products suspended as they move through a mechanical defeathering machine or the like comprising; movable means taking the form of jaw elements that may be opened and shut relatively; said jaw elements being adapted to engage and hold the carcasses of the birds being treated, by their necks or feet; supporting means for said jaw elements upon which said jaw elements are slidably mounted to move up and down when the shackle is maintained in a suspended position; said supporting means cooperating with said jaw elements to effect relative opening of the jaw elements upon upward movement, and shutting upon downward movement; whereby the necks or feet of the individual carcass of the birds may be inserted in said movable means between the open jaw elements and enclosed therein as the jaw elements are moved downwardly, the weight of the individual carcasses being sufficient to maintain the jaw elements closed, to engage and support the individual carcasses of the birds in suspended position, and said jaw elements being opened to release the engaged necks or feet upon lifting of the jaw elements.

3. A releasable shackle for holding individual carcasses of poultry products suspended as they move through a mechanical defeathering machine or the like comprising; movable means taking the form of jaw elements that may be opened and shut relatively; said jaw elements being pivotally joined together; said jaw elements being adapted to engage and hold the carcasses of the birds being treated, by their necks or feet; supporting means for said jaw elements upon which said jaw elements are slidably mounted to move up and down when the shackle is maintained in a suspended position; said supporting means cooperating with said jaw elements to effect relative opening of the jaw elements upon upward movement, and shutting upon downward movement; whereby the necks or feet of the individual carcasses of the birds may be inserted in said movable means between the open jaw elements and enclosed therein as the jaw elements are moved downwardly, the weight of the individual carcasses being sufficient to maintain the jaw elements closed, to engage and support the individual carcasses of the birds in suspended position, and said jaw elements being opened to release the engaged necks or feet upon lifting of the jaw elements.

4. A releasable shackle for holding individual carcasses of poultry products suspended as they move through a mechanical defeathering machine or the like comprising; movable means taking the form of jaw elements that may be opened and shut relatively; said jaw elements being adapted to engage and hold the carcasses of the birds being treated, by their necks or feet; supporting means for said jaw elements upon which said jaw elements are slidably mounted to move up and down when the shackle is maintained in a suspended position; said supporting means having a cam element fixed thereto to cooperate with at least one of said jaw elements to effect relative opening of the jaw elements upon upward movement, and shutting upon downward movement; whereby the necks or feet of the individual carcasses of the birds may be inserted in said movable means between the open jaw elements and enclosed therein as the jaw elements are moved downwardly, the weight of the individual carcasses being sufficient to maintain the jaw elements closed, to engage and support the individual carcasses of the birds in suspended position, and said jaw elements being opened to release the engaged necks or feet upon lifting of the jaw elements.

5. A releasable shackle for holding individual carcasses of poultry products suspended as they move through a mechanical defeathering machine or the like comprising; movable means taking the form of jaw elements that may be opened and shut relatively; said jaw elements being adapted to engage and hold the carcasses of the birds being treated, by their necks or feet; supporting means for said jaw elements upon which said jaw elements are slidably mounted to move up and down when the shackle is maintained in a suspended position; said supporting means taking the form of diverging cam tracks to engage said jaw elements to effect relative opening of the jaw elements upon upward movement, and shutting upon downward movement; whereby the necks or feet of the individual carcasses of the birds may be inserted in said movable means between the open jaw elements and enclosed therein as the jaw elements are moved downwardly, the weight of the individual carcasses being sufficient to maintain the jaw elements closed, to engage and support the individual carcasses of the birds in suspended position, and said jaw elements being opened to release the engaged necks or feet upon lifting of the jaw elements.

6. A releasable shackle for holding individual carcasses of poultry products suspended as they move through a mechanical defeathering machine or the like comprising; movable means taking the form of jaw elements that may be opened and shut relatively; said jaw elements being adapted to engage and hold the carcasses of the birds being treated, by their necks or feet; supporting means for said jaw elements upon which said jaw elements are slidably mounted to move up and down when the shackle is maintained in a suspended position; said supporting means cooperating with said jaw elements to effect relative opening of the jaw elements upon upward movement, and shutting upon downward movement; said jaw elements having nose portions integral therewith on each of the elements that are moved apart relatively when the jaw elements are opened and closed; said jaw elements being relieved adjacent each of their nose portions to provide a guiding action to aid the insertion of the necks or feet into the open jaw elements; whereby the necks or feet of the individual carcasses of the birds may be inserted in said movable means between the open jaw elements and enclosed therein as the jaw elements are moved downwardly, the weight of the individual carcasses being sufficient to maintain the jaw elements closed, to engage and support the individual carcasses of the birds in suspended position, and said jaw elements being opened to release the engaged necks or feet upon lifting of the jaw elements.

7. A releasable shackle for holding individual carcasses of poultry products suspended as they move through a mechanical defeathering machine or the like comprising; at least one pair of jaw elements that may be opened and shut relatively; said jaw elements each being provided with a notch disposed to mutually cooperate and of a size to engage and hold the individual carcasses of the birds being treated, by their necks; supporting means for said jaw elements upon which said jaw elements are slidably mounted to move up and down when the shackle is maintained in a suspended position; said supporting means cooperating with said jaw elements to effect relative opening of the jaw elements upon upward movement, and shutting upon downward movement; whereby the necks of the individual carcasses of the birds may be inserted between the open jaw elements and enclosed therein as the jaw elements are moved downwardly, the weight of the individual carcasses being sufficient to maintain the jaw elements closed, to engage and support the individual carcasses of the birds in suspended position and said jaw elements being opened to release the engaged necks upon lifting of the jaw elements.

8. A releasable shackle for holding the carcass of a poultry product suspended as it moves through a mechanical defeathering machine or the like comprising; two pairs of jaw elements that may be opened and shut relatively; said pairs of jaw elements each being provided with cooperating notches to separately hold the legs of a carcass of the bird being treated; supporting means for said jaw elements upon which said jaw elements are slidably mounted to move up and down when the shackle is maintained in a suspended position; said supporting means cooperating with said jaw elements to effect relative opening of the jaw elements upon upward movement, and shutting upon downward movement; said pairs of jaw elements being independently operable, but projecting laterally from the shackle structure such that each pair may be separately engaged by the right and left hand respectively of an operator during loading and unloading of the shackle, whereby the legs of a carcass of a bird may be inserted between the open jaw elements and enclosed therein as the jaw elements are moved downwardly, the weight of the individual carcasses being sufficient to maintain the jaw elements closed, to engage and support the carcass of the bird in suspended position, and said jaw elements being opened to release the engaged legs upon lifting of the jaw elements.

9. A releasable shackle for holding carcasses of poultry products suspended as they move through a mechanical defeathering machine or the like comprising; three pairs of jaw elements that may be opened and shut relatively; two pairs of said jaw elements each being provided with cooperating notches to engage and hold the legs of the carcasses of one of the birds adjacent their feet; the remaining pair of said jaw elements being provided with cooperating notches to engage and hold another carcass of the poultry products being treated, by its neck; supporting means for said jaw elements upon which said jaw elements are slidably mounted to move up and down when the shackle is maintained in a suspended position; said supporting means cooperating with said jaw elements to effect relative opening of the jaw elements upon upward movement, and shutting upon downward movement; said three pairs of jaw elements being independently operable but said two pairs projecting laterally from the shackle on one side thereof such that each of the pairs may be separately engaged by the right and left hand respectively of an operator during loading and unloading of the shackle, and said remaining pair of jaw elements projecting laterally from the opposite side of the shackle, whereby the neck or legs of the carcasses of the birds may be inserted between the open jaw elements and enclosed therein as the jaw elements are moved downwardly, the weight of the individual birds being sufficient to maintain the jaw elements closed, to engage and support the individual carcasses of the birds in suspended position, and said jaw elements being opened to release the engaged necks or legs upon lifting of the jaw elements.

10. A releasable shackle for holding carcasses of poultry products suspended as they move through a mechanical defeathering machine or the like comprising; three pairs of jaw elements that may be opened and shut relatively; two of said pairs of jaw elements each being provided with cooperating notches to engage the legs of one of the carcasses of the birds and the remaining pair of jaw elements being provided with cooperating notches to engage and hold the neck of another of the carcasses of the birds being treated; said pairs of leg engaging jaw elements projecting in one direction and said pair of neck engaging jaw elements projecting in a substantially diametrically opposite direction; supporting means for said jaw elements upon which said jaw elements are slidably mounted to move up and down when the shackle is maintained in a suspended position; said supporting means cooperating with said jaw elements to effect relative opening of the jaw elements upon upward movement, and shutting upon downward movement; said two pairs of jaw elements being independently operable but projecting such that each of the pairs may be separately engaged by the right and left hands of an operator to be simultaneously operated during loading and unloading of the shackle, whereby the neck or legs of the individual carcasses of the birds may be inserted between the open jaw elements and engaged therebetween as the jaw elements are moved downwardly, the weight of the individual carcasses being sufficient to maintain the jaw elements closed, to engage and support the individual carcasses of the birds in suspended position, and said jaw elements being opened to release the engaged neck or legs upon lifting of the jaw elements.

ELMER M. DAVIS.

REFERENCES CITED

The following references are of record in the file of this patent:

UNITED STATES PATENTS

| Number | Name | Date |
|---|---|---|
| 899,391 | Farrell | Sept. 22, 1908 |
| 1,773,042 | Jones | Aug. 12, 1930 |